United States Patent Office 3,424,563
Patented Jan. 28, 1969

3,424,563
SELECTIVE EXTRACTION OF BORON
FROM AQUEOUS SOLUTIONS
Robert R. Grinstead, Walnut Creek, Calif., assignor to
The Dow Chemical Company, Midland, Mich., a corporation of Delaware
No Drawing. Filed Feb. 3, 1966, Ser. No. 538,111
U.S. Cl. 23—312      24 Claims
Int. Cl. C01b 15/12; B01j 9/12

This invention relates to a process for the separation of boron values from aqueous solutions and is more particularly concerned with a process for the selective liquid-liquid extraction of boron compounds from aqueous solutions containing boron compounds in addition to other compounds.

Boron and boron compounds have been seperated and recovered from aqueous solutions by employing fractional crystallization and solvent extraction processes. When solvent extraction has been employed to recover boron from aqueous solutions containing other metal ions, some of the other ions were likewise extracted resulting in a necessity for separating the boron from such ions. Such coextraction is undesirable but until now no selective extraction process has been available which would remove boron values and reject the other cations present.

It is an object of this invention to provide a process whereby boron may be selectively extracted from aqueous soltuions containing the same. It is likewise an object of this invention to provide a process whereby aqueous solutions or brines may be purified by removing the boron values therefrom. It is another object of this invention to provide a process whereby boron values may be separated from aqueous solutions or brines containing the same by continuous liquid-liquid extraction. These and other objects and advantages of the present invention will become obvious from a reading of the following detailed specification thereof.

It has now been discovered that boron values may be recovered from brines or other aqueous solutions by contacting such aqueous solution with any one or more of certain water-immiscible organic extraction agents herein specified in combination with certain alkyl ammonium salts to extract boron values into the organic phase. Such organic phase is then treated to recover the boron values therefrom. Such a process may be conducted as a batch extraction but it is particularly adaptable to a continuous liquid-liquid extraction.

The method of the invention may be applied in treating substantially any aqueous solution containing boron values, but is particularly adapted to the treatment of relatively concentrated brines containing boron values as a minor portion thereof. Typical of such brines are the Monroe brines, magnesium chloride brines derived from sea water and other natural saline waters, which contain minor amounts of boron. Other suitable aqueous solutions include mineral acid leaches of boron-containing metal alloys or ores.

The organic extraction agents useful in this process are combinations of a relatively limited group of substantially water-immiscible organic diols with substantially water-immiscible alkyl ammonium salts. While the alkyl ammonium salts alone have little or no ability to extract boron values from solutions thereof, the combination of such alkyl ammonium salts with certain organic diols not only proves effective in the extraction of boron values but acts to reject other ions therein and, therefore, to permit a highly selective extraction of boron. The organic diols useful herein are the substituted catechols containing from 8 to 20 carbon atoms and the substituted hydroxy benzyl alcohols containing from 8 to 20 carbon atoms. Substituent groups may be alkyl, cycloalkyl, aralkyl, halo, cyano, alkoxy, or haloalkyl and substitution may occur at one or more sites on the benzene nucleus. Examples of suitable organic diols include 4-t-butyl pyrocatechol, 4-t-octyl catechol, 3,5-di-tertiary-butylcatechol, 4(1,1,3-trimethylbutyl)-2-chlorosaligenin, 4 - nonyl - 2- chlorosaligenin, 4-n-propyl catechol, 3-methyl-4-isopropyl catechol, 2-hydroxy-3-hydroxymethyl - 1,5 - dimethyl benzene, 3-hydroxy-4-hydroxymethyl toluene, 3-tertiary-butyl-5-methyl catechol, 3,5-diisopropyl catechol, 3-methy-5-tert-butylcatechol, 3-methyl-6-tertiary butyl-catechol, 3-methyl-5-tertiary octyl catechol, 3-tertiary octyl-5-methylcatechol, 3-isopropyl catechol, and the like. The preferred organic diols, however, are substituted catechols containing from about 10 to about 18 carbon atoms. In order to efficiently extract boron values from solutions thereof, it is necessary that at least two moles of organic diol be present for each mole of boron value and from about 4 to 6 moles of organic diol per mole of boron is usually preferred.

The alkyl ammonium salt portion of the substantially water-immiscible organic extraction agent may be any mono-, di-, tri-, or tetraalkyl ammonium chloride, bromide, nitrate, sulfite, sulphate or phosphate having from 6 to 40 carbon atoms. The salts derivable from amines containing 12 to 30 carbons are preferable, however. For efficient cyclic operations, the anion of the ammonium salt used should be the same as the dominant anion in the aqueous solution being extracted and the same as the anion of the stripping acid used to recover the boron from the organic extract. Thus, alkyl ammonium chlorides are particularly preferred for extracting boron from chloride brines. In order to effectively extract boron and reject other cations from an aqueous solutions, it is usually necessary to employ a molar ratio of diol to alkyl ammonium salt from about 1.0 to 0.2 to about 1.0 to 5.0. Ratios of from 1.0 to 0.4 to 1.0 to 1.0 are preferred however.

While the organic extraction agent may be employed directly to extract boron values from aqueous solutions it is preferred to use a carrier or solvent for such active materials which is water-immiscible and inert to the extraction system. Virtually any liquid effective as a solvent for the organic extracting agent, having a miscibility of less than about 10 percent by weight in water and chemically inert to the extraction system may be used as a carrier. Typical of such materials are aliphatic, aromatic, alicyclic hydrocarbons, alcohols, ethers, esters and chlorinated hydrocarbons. The aliphatic, aromatic and alicyclic hydrocarbons have been found to be particularly effective. It is desirable to employ a solution of organic extraction agent in such solvent which is from about 0.1 to 0.5 molar in the diol portion of the organic extraction agent.

A solution of organic extractant prepared in the above-described manner is contacted with the aqueous solution to be extracted in any suitable manner to provide intimate contact, for example, counter current flow, stirring, shaking, and the like. Contact times greater than 0.5 minute are generally required for adequate extraction, and contact times from 4 to 10 minutes are usually preferred. A ratio by volume of organic to aqueous phase of 1:100 to 10:1 or higher may be used but phase ratios from 1:10 to 10:1 are usually preferred.

The temperature of the liquids during this extraction step is not critical, but a range of from about 10° to 90° C. is usually employed. It is convenient to operate at or near room temperature and temperatures of 20° C. to 60° C. are usually preferred.

The pH of the aqueous solution during extraction may be varied from 3 to as high as 10 in some instances depending on the particular extraction agent employed and on the nature of the aqueous solution being extracted. For example, when substituted 2-hydroxy benzyl alcohols are employed with mono, di- or trialkyl ammonium salts,

| Extractant | pH | Boron Distribution Coefficient Boron in organic phase / Boron in aqueous phase | Boron in the Organic Phase, Equivs./l. | Total Cations in Organic Phase [1], Equivs./l. |
|---|---|---|---|---|
| Para-tert.-butyl-2-hydroxyl-3-methylbenzyl alcohol in solvent | 5.2 | 1.0 | 0.0065 | 0.015 |
| Para-tert.-butyl-2-hydroxy-3-methylbenzyl alcohol plus (trioctyl-methyl ammonium chloride) in solvent | 5.6 | 3.1 | 0.0099 | 0.003 |

[1] Analyzed only for Mg, Ca, Na and K.

a pH of from about 3 to 7 is usually desirable, with a pH of 4 to 6 being preferred. When a substituted 2-hydroxy benzyl alcohol is employed in combination with tetraalkyl ammonium salts, a pH of about 3 to about 10 may be employed with a pH of 4 to 9 being preferred. When a substituted catechol is employed with any of the alkyl ammonium salts, a pH of 3 to about 8 may be used but a pH of 4 to 7 is preferred. As a general rule, a pH of 5 to 6 produces the most efficient extraction of boron values but care must be taken, particularly in the more concentrated brines that a pH is maintained sufficiently low to prevent precipitation of other values, e.g. magnesium values, from the solution being extracted.

After intimate contact between the organic extractant solution and the aqueous solution for effecting the extraction, the organic and aqueous phases are allowed to separate. Even with single stage contact, most of the boron originally present in the aqueous solution is extracted into the organic phase from the aqueous phase. The organic and aqueous phases are easily separated by allowing layers to form and drawing off one or both such layers. The aqueous layer, now substantially reduced in boron values, may be put to uses wherein boron values are undesirable.

The organic phase, after extraction of the aqueous solution, contains the boron values in relatively concentrated form. These may be recovered from the organic phase by contact with an acidic aqueous solution, whereby the boron is stripped from the organic phase and enters the aqueous acidic phase. Mineral acids such as HCl, $H_2SO_4$, $H_3PO_4$, $H_2SO_3$ are suitable for such stripping operation, as are organic water-soluble acids, such as alkyl- and arylsulfonic acids.

The following examples are provided as a more detailed description of the various embodiments of the invention but are not to be construed as limiting the scope of the invention thereto.

Example 1

In order to demonstrate the effectiveness of this invention in a batch process, boron values present in a magnesium chloride brine were extracted from the brine by a single stage batch procedure. The magnesium chloride brine employed had the following composition:

| | |
|---|---|
| Magnesium chloride, weight percent | 36.0 |
| pH | 5.6 |
| Boron, parts per million | 150 |
| Calcium, weight percent | 0.1 |
| Sodium, weight percent | 0.3 |
| Potassium, parts per million | 125 |

The water-immiscible organic extraction agent was prepared by adding sufficient 5-tertiary-butyl-2-hydroxy-3-methylbenzyl alcohol to an aromatic hydrocarbon solvent to produce a solution 0.2 molar in the said alcohol. To this solution was added a sufficient quantity of trioctyl methyl ammonium chloride to make the resulting solution 0.2 molar with respect to the substituted ammonium salt.

Additionally, a 0.2 molar solution of 5-tertiary-butyl-2-hydroxy-3-methylbenzyl alcohol and the same aromatic hydrocarbon solvent was prepared which contained no alkyl ammonium salt component.

To a 20 ml. sample of magnesium chloride brine was added 20 ml. of the particular organic extractant employed. The mixture was stirred for 15 minutes at 60° C. The phases were separated and analyzed. Results were as follows:

Example 2

The procedure of Example 1 was followed with the exception that the hydroxy compound employed was 5-tertiary-butyl-3-chloro-2-hydroxybenzyl alcohol. Analysis of the organic and aqueous phases revealed the following:

| Extractant | pH | Boron Distribution Coefficient | Boron in the Organic Phase, Equivs./l. | Total Cations in Organic Phase [1], Equivs./l. |
|---|---|---|---|---|
| 5-tert.-butyl-3-chloro-2-hydroxybenzyl alcohol in solvent | 5.0 | 0.5 | 0.005 | 0.03 |
| 5-tert.-butyl-3-chloro-3-hydroxybenzyl alcohol plus trioctyl methyl ammonium chloride in solvent | 5.1 | 23.0 | 0.017 | 0.01 |

[1] Analyzed only for Mg, Ca, Na and K.

Example 3

The procedure of Example 2 was employed except that the solvent employed contained 60 percent by volume of kerosene and 40 percent by volume of an aromatic hydrocarbon solvent. The brine extracted had the following composition:

| | G/l. |
|---|---|
| NaCl | 190 |
| $Na_2SO_4$ | 60 |
| $Na_2CO_3$ | 40 |
| KCl | 50 |
| $Na_2B_4O_7$ | 7.6 |

Analysis of the organic and aqueous phases after extraction revealed the following.

| Extractant | pH | Boron Distribution Coefficient | Boron in Organic Phase, Equivs./l. | Na and K ions in Organic Phase, Equivs./l. |
|---|---|---|---|---|
| 5-tert.-butyl-3-chloro-2-hydroxylbenzyl alcohol in solvent | 9.1 | 0.37 | 0.062 | 0.084 |
| 5-tert.-butyl-3-chloro-2-hydroxylbenzyl alcohol plus trioctyl methyl ammonium chloride | 9.5 | 0.40 | 0.054 | 0.014 |

Example 4

A series of three experiments were conducted wherein 60 ml. portions of a brine containing 36% by weight $MgCl_2$ and additionally containing small amounts of calcium, boron and sodium were contacted with 20 ml. portions of a 0.20 molar solution of tertiary butyl catechol in a kerosene solvent containing 4% by volume 2-octanol and containing various proportions of trioctylamine hydrochloride. The contacts between the aqueous and organic phases were conducted at room temperature and the pH was maintained at 4.5 by addition of NaOH or HCl as necessary until the pH was constant for 15 minutes. The phases were then allowed to separate into the aqueous raffinate phase and the organic extractant phase. Analysis of the phase gave the following results:

|  | gm./l. | | | |
|---|---|---|---|---|
|  | B | Ca | Na | Mg |
| Initial Brine | 0.16 | 0.70 | 1 73 | 121 |
| Extractant containing no alkyl ammonium salt: | | | | |
| Aqueous raffinate phase | 0.004 | 0.40 | 2 24 | 121 |
| Organic Extractant phase | 0.540 | 0.92 | 0 21 | 0.22 |
| Extractant 0.10 molar in trioctylamine hydrochloride: | | | | |
| Aqueous raffinate phase | 0.08 | 0.67 | 1.76 | 121 |
| Organic extractant phase | 0.400 | 0.084 | 0.005 | 0.074 |
| Extractant 0.20 molar in trioctylamine hydrochloride: | | | | |
| Aqueous raffinate phase | 0.011 | 0 70 | 1.81 | 121 |
| Organic extractant phase | 0.510 | (1) | 0.017 | 0.027 |

1 None detectable.

Example 5

An aqueous solution of 36 weight percent $MgCl_2$ containing boron and various metallic ions was contacted for 5 minutes at room temperature and a pH of 5.0 with an equal volume of a 0.27 molar solution of tertiary butyl catechol in a solution of kerosene containing 2 volume percent 2-octanol. The organic phase was stripped by contact for 5 minutes with an equal volume of 1 N HCl and analyzed for boron, calcium and magnesium. An identical experiment was then conducted wherein the organic extractant was also 0.2 molar in the hydrochloride of trioctylamine. The results were as follows:

|  | gm./l. | | |
|---|---|---|---|
|  | B | Ca | Mg |
| Original Brine | 0.15 | 0.83 | 125 |
| Extractant with no amine hydrochloride: | | | |
| Brine after extraction | 0.001 | 0.41 | 125 |
| HCl strip solution | 0.15 | 0.42 | 0.15 |
| Extractant with amine hydrochloride: | | | |
| Brine after extraction | 0.027 | 0.83 | 125 |
| HCl strip solution | 0.12 | <0.01 | <0.05 |

Similar results were obtained when the organic phase was stripped with a saturated solution of sulfur dioxide rather than HCl.

Example 6

A sample of $MgCl_2$ brine containing 35.8 weight percent $MgCl_2$, 6 mg./l. boron, 0.17 weight percent calcium, 0.78 weight percent sodium and 125 p.p.m. potassium was mixed with an equal volume of an aromatic solvent solution 02 molar in di-t-butyl catechol and 0.2 molar in trioctylamine hydrochloride in a beaker. The aromatic solvent contained 66 weight percent aromatics, 25 weight percent naphthalene and 9 weight percent paraffins. Care was taken to exclude air from contact with the catechol and the mixture was stirred for 60 minutes in a closed beaker at room temperature. During the stirring period, pH was continuously monitored and adjusted by the addition as necessary of an acid or base. At the end of this period of contact, the layers were allowed to separate and analyzed for boron content.

A second sample of the same brine was treated and analyzed in the same manner except that the organic extraction agent contained no alkyl ammonium salt. The results were as follows:

| Extractant | pH | P.p.m. Boron Conc. in Aqueous Phase | P.p.m. Boron Conc. in Organic Phase |
|---|---|---|---|
| Di-tertiary-butyl catechol | 5.2 | 130 | 33 |
| Di-tert.-butyl catechol plus trioctylamine hydrochloride | 5.0 | 14 | 123 |

Example 7

A 36 weight percent $MgCl_2$ brine having a pH of 5.0 and containing a small amount of boron was stirred for 5 minutes with a 0.2 molar solution of tertiary butyl catechol in an aromatic solvent. The aromatic solvent contained 66 weight percent aromatics, 25 weight percent naphthenes and 9 weight percent paraffins. A portion of the aqueous raffinate phase was then analyzed for boron and a portion of the organic phase was stripped by stirring with an equal volume of 1 N HCl for 5 minutes at room temperature. The acid strip solution was then analyzed for boron to determine the boron content thereof.

The remaining organic phase was contacted with a fresh volume of the boron-containing $MgCl_2$ brine in the same manner and the aqueous and organic phases were again analyzed in the same manner. These steps were repeated and the analyses are shown in the tabulation which follows.

For comparison, an identical experiment was conducted wherein the tertiary butyl catechol extractant solution additionally contained a 0.2 molar concentration of trioctylamine hydrochloride. The results of this experiment are likewise shown in the following tabulation:

|  | Tertiary Butyl Catechol Solvent | | Tertiary Butyl Catechol and Trioctyl amine Hydrochloride Solvent | |
|---|---|---|---|---|
|  | Boron in Acid Strip, mg./l. | Boron in Aqueous Raffinate, mg./l. | Boron in Acid Strip, mg./l. | Boron in Aq. Raffinate, mg./l. |
| Sample No.: | | | | |
| 1 | 80 | 10 | 150 | 10 |
| 2 | 100 | 40 | 400 | 40 |
| 3 | 150 | 60 | 440 | 60 |
| 4 | 150 | 80 | 550 | 80 |
| 5 | 150 | 125 | 690 | 125 |

Example 8

A series o fexperiments were conducted wherein 20 ml. portions of a 0.10 molar solution of tertiary butyl catechol in an aromatic solvent was contacted with 80 ml. portions of a 36 weight percent $MgCl_2$ brine containing 0.16 gm./l. of boron and 0.76 gm./l. of calcium. After thorough mixing and contact the phases were separated and the organic phase was stripped with an equal volume of 1 molar HCl. Both the aqueous raffinate and the acid strip solution were analyzed for boron and calcium.

A comparative series of extractions were conducted in the same manner except that the tertiary butyl catechol solution also contained a 0.05 molar concentration of an amine.

The distribution of boron and calcium between the aqueous raffinate and the acid strip solutions is shown in the following tabulation:

| Experiment No. | Amine | pH | Concentration gm./l. | | | |
|---|---|---|---|---|---|---|
|  |  |  | Aqueous Raffinate | | Acid Strip | |
|  |  |  | B | Ca | B | Ca |
| 1 | Methyl trioctyl ammonium chloride | 4.0 | 0.11 | 0.76 | 0.30 | 0.001 |
| 2 | None | 4.0 | 0.15 | 0.68 | 0.13 | 0.27 |
| 3 | Tetradecyl ammonium chloride | 4.5 | 0.084 | 0.76 | 0.32 | 0.032 |
| 4 | None | 4.5 | 0.124 | 0.70 | 0.13 | 0.18 |

Example 9

An 80 ml. portion of an aqueous solution having a 1 molar concentration of $Ca(NO_3)_2$ and 0.16 gm./l. of boron was extracted with 20 ml. of a 0.10 molar solution of tertiary butyl catechol in an aromatic solvent. The pH during extraction was 5.8. After extraction, the phases were separated and the organic phase was stripped with an equal volume of 1 molar HCl. The aqueous raffinate was analyzed for boron and the acid strip solution was analyzed for both boron and calcium.

A second 80 ml. portion of such $Ca(NO_3)_2$ solution was extracted in the same manner except that the tertiary butyl catechol solution contained a 0.05 molar concentration of methyl trioctyl ammonium chloride.

Results of such extractions are summarized in the following tabulation:

| Organic Extractant | Aqueous Raffinate, B, gm./l. | Acid Strip | |
|---|---|---|---|
| | | B, gm./l. | Ca, g m. |
| Tertiary butyl catechol | 0.16 | 0.008 | 0.014 |
| Tertiary butyl catechol and methyl trioctylammonium chloride | 0.083 | 0.305 | 0.002 |

In the same manner, under the same conditions and with the same extractants, an aqueous solution containing a 1 molar concentration of $CaCl_2$ and a 2 molar concentration of NaBr was extracted and separated. The results of such extraction are summarized as follows:

| Organic Extractant | Aqueous Raffinate, B, gm./l. | Acid Strip | |
|---|---|---|---|
| | | B, gm./l. | Ca, gm./l. |
| Tertiary butyl alcohol | 0.14 | 0.080 | 0.13 |
| Tertiary butyl alcohol and methyl trioctylammonium chloride | 0.094 | 0.26 | 0.008 |

Example 10

In the same manner as Example 6, extractions are made with 4-t-octyl catechol, 3,5 - di - tertiary-butyl-catechol, 4(1,1,3,3 - tetramethylbutyl) - 2-chlorosaligenin, 4-nonyl-2-chlorosaligenin, 4-n-propyl catechol, 3-methyl, 4-isopropyl catechol, 2-hydroxy, 3-hydroxymethyl, 1,5-dimethyl benzene, 3-hydroxy, 4-hydroxymethyl toluene, 3-tertiary-butyl-5-methyl catechol, 3,5-diisopropyl catechol, 3-methyl-5-tert.-butyl catechol, 3-methyl-6-tertiary butyl catechol, 3-methyl-5-tertiary octyl catechol, 3-tertiary octyl-5-methylcatechol, 3-isopropyl catechol, and the like in combination with a water-immiscible alkyl ammonium salt containing from 6 to 40 carbon atoms. In all instances boron is preferentially extracted into the organic phase and good rejection of cations such as calcium occurs.

Various modifications can be made in the present invention without departing from the spirit or scope thereof for it is understood that I limit myself to that only defined in the appended claims.

I claim:
1. A process for the selective extraction of boron values from aqueous solutions thereof which comprises intimately contacting at a pH of from 3 to 7 said aqueous solution with a substantially water-immiscible organic extractant which comprises a mixture of one or more organic diols selected from the group consisting of substituted catechols and substituted hydroxy benzyl alcohols containing from 7 to 20 carbon atoms with one or more water-immiscible alkyl ammonium salts containing from 12 to 30 carbon atoms wherein said organic diol is employed in a ratio of at least 2 moles of such diol per mole of boron values present and wherein the mole ratio of said organic diol to alkyl ammonium salt is from 1.0:0.2 to 1.0:5.0, separating the organic and aqueous phases and separating the boron values from the organic phase.

2. The process of claim 1 wherein the organic diol is a substituted catechol containing from 8 to 20 carbon atoms.

3. The process of claim 1 wherein the substituted catechol is tertiary butyl catechol.

4. The process of claim 1 wherein the pH during extraction is from 4 to 6.

5. The process of claim 1 wherein the mole ratio of substituted catechol of alkyl ammonium salt is from 1.0:0.4 to 1.0:1.

6. The process of claim 1 wherein the organic extraction agent is a mixture of tertiary butyl catechol and trioctyl ammonium chloride in a mole ratio of between 1.0:0.4 to 1.0 to 1.0 of tertiary butyl catechol to trioctyl ammonium chloride.

7. The process of claim 1 wherein the alkyl ammonium salt is trioctyl ammonium chloride.

8. The process of claim 1 wherein the alkyl ammonium salt is trioctyl methyl ammonium chloride.

9. The process of claim 1 wherein the substituted hydroxybenzyl alcohol is 5 - tertiary - butyl-3-chloro-2-hydroxybenzyl alcohol.

10. The process of claim 1 wherein the substituted hydroxybenzyl alcohol is 5-tertiary-butyl-2-hydroxy-3-methylbenzyl alcohol.

11. A process for the selective extraction of boron values from aqueous solutions thereof which comprises intimately contacting at a pH of from about 3 to 7 said aqueous solution with an organic extraction agent which comprises a mixture of one or more substituted hydroxybenzyl alcohols containing from 8 to 20 carbons with a mono-, di- or trialkyl ammonium salt containing from 6 to 40 carbons wherein said substituted hydroxybenzyl alcohol is present in a ratio of at least 2 moles thereof per mole of boron values to be extracted and wherein the mole ratio of hydroxybenzyl alcohol to alkyl ammonium salt is from 1.0:0.2 to 1.0:5.0, separating the organic and aqueous phases and separating the boron values from the organic phase.

12. The process of claim 11 wherein the boron values are separated from the organic phase by treatment thereof with an aqueous mineral acid.

13. The process of claim 11 wherein the substituted hydroxybenzyl alcohol is 5-tertiary-butyl-2-hydroxyl-3-methylbenzyl alcohol.

14. The process of claim 11 wherein the pH during extraction is from 4 to 6.

15. The process of claim 11 wherein the mole ratio of substituted hydroxybenzyl alcohol to mono-, di- or triammonium salt is from 1.0:0.4 to 1.0:1.0.

16. The process of claim 11 wherein the organic extraction agent is a mixture of 5-tert.-butyl-2-hydroxy-3-methylbenzyl alcohol and trioctyl ammonium chloride in a mole ratio of from 1.0 to 0.4 to 1.0:1.0 of alcohol to trioctyl ammonium chloride.

17. The process of claim 11 wherein the substituted hydroxybenzyl alcohol is 5-tertiary-butyl-3-chloro-2-hydroxybenzyl alcohol.

18. A process for the selective extraction of boron values from aqueous solutions thereof which comprises intimately contacting at a pH of from 3 to 7 said aqueous solution with an organic extraction agent which comprises a mixture of one or more substituted hydroxybenzyl alcohols containing 8 to 20 carbons with a tetraalkyl ammonium salt containing from 6 to 40 carbons wherein said alcohol is present in a ratio of at least 2 moles thereof per mole of boron to be extracted and wherein the mole ratio of hydroxybenzyl alcohol to tetraalkylammonium salt is from 1.0:0.2 to 1.0:5.0, separating the organic and aqueous phases and separating the boron values from the organic phase.

19. The process of claim 18 wherein the boron values are separated from the organic phase by treatment with an aqueous mineral acid.

20. The process of claim 18 wherein the substituted hydroxybenzyl alcohol is 5-tert.-butyl-2-hydroxyl-3-methylbenzyl alcohol.

21. The process of claim 18 wherein the pH during extraction is from 4–9.

22. The process of claim 18 wherein the mole ratio of substituted hydroxyalkyl benzyl alcohol to tetraalkyl ammonium salt is from 1.0:0.4 to 1.0:1.0.

23. The process of claim 18 wherein the organic extraction agent is a mixture of p-tert.-butyl-2-hydroxyl-3-methylbenzyl alcohol and trioctyl methyl ammonium chloride in a mole ratio of from 1.0:0.4 to 1.0:1.0 of alcohol to alkyl ammonium chloride.

24. The process of claim 18 wherein the boron-containing aqueous solution starting material is a magnesium chloride brine.

References Cited

UNITED STATES PATENTS

| | | | |
|---|---|---|---|
| 2,926,991 | 3/1960 | Bragdon | 23—312 X |
| 2,968,523 | 1/1961 | Cunningham | 23—312 X |
| 2,969,275 | 1/1961 | Garrett | 23—312 X |
| 3,105,746 | 10/1963 | Schechter | 23—312 |
| 3,107,157 | 10/1963 | Johnston | 23—312 |
| 3,111,383 | 11/1963 | Garrett | 23—149 |

FOREIGN PATENTS

| | | |
|---|---|---|
| 816,510 | 7/1959 | Great Britain. |
| 910,541 | 11/1962 | Great Britain. |

NORMAN YUDKOFF, *Primary Examiner.*

S. J. EMERY, *Assistant Examiner.*

U.S. Cl. X.R.

23—59, 149